Figure 1:
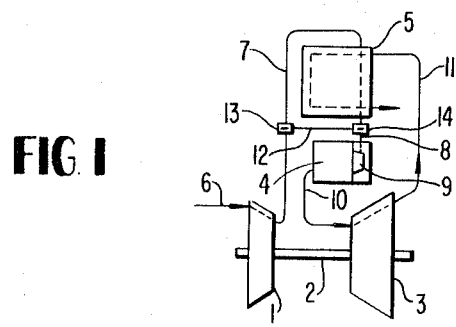

United States Patent
Hagen et al.

[15] 3,657,886
[45] Apr. 25, 1972

[54] GAS TURBINE ENGINE

[72] Inventors: Hermann Hagen, Munich-Pasing; Adolf Fehler, Puchheim; Christian Greune, Schongeising, all of Germany

[73] Assignee: Motoren-und Turbinen-Union Munich GmbH, Munich, Germany

[22] Filed: Sept. 30, 1969

[21] Appl. No.: 862,329

[30] Foreign Application Priority Data

Oct. 8, 1968   Germany..................P 18 01 795.3

[52] U.S. Cl. ................................................60/39.74
[51] Int. Cl. ..................................................F02c 7/22
[58] Field of Search...................................60/39.74

[56] References Cited

UNITED STATES PATENTS

| | | |
|---|---|---|
| 2,828,605 | 4/1958 | Dobson............................60/39.74 X |
| 2,968,925 | 1/1961 | Blevans et al.....................60/39.74 X |
| 3,426,527 | 2/1969 | O'Connor..........................60/39.74 X |
| 2,619,162 | 11/1952 | Feilden..............................60/39.74 |
| 2,857,204 | 10/1958 | Gross................................60/39.74 |
| 2,846,845 | 8/1958 | Parker..............................60/39.74 X |
| 2,595,759 | 5/1952 | Buckland et al...................60/39.74 |

Primary Examiner—Mark M. Newman
Assistant Examiner—R. B. Rothman
Attorney—Craig, Antonelli & Hill

[57] ABSTRACT

A gas turbine engine in which the combustion air is normally heated in a heat exchanger by the exhaust gases, and in which the air used to blow out the fuel nozzle or nozzles, when the fuel supply is shut-off, has a temperature lower than the normal temperature of the combustion air.

10 Claims, 3 Drawing Figures

PATENTED APR 25 1972 3,657,886

INVENTORS
HERRMANN HAGEN
ADOLF FEHLER
CHRISTIAN GREUNE

BY Craig, Antonelli, Stewart & Hill
ATTORNEYS

GAS TURBINE ENGINE

The present invention relates to a single- or multi-shaft turbine engine which includes one or more compressors, at least one combustion chamber and one or more turbines with at least one heat exchanger and which, furthermore, is provided with installations for blowing out the fuel nozzle or nozzles with air to prevent a build-up of fuel deposits.

In gas turbine drive units equipped with a heat exchanger, the temperature of the combustion air which is heated up by the exhaust gases of the engine on its way to the combustion chamber, is relatively high (500° to 600° C).

If the gas turbine engine is put out of operation for a short period of time by turning off the fuel supply, there is then the danger that some fuel remains, left behind in the fuel nozzle, cause a coking or carbonization of the fuel nozzle due to the heating from the combustion chamber.

To remedy this unsatisfactory state of affairs, it has already been suggested to blow out the fuel nozzle, when the fuel supply is cut off. One utilizes for this purpose the air present in the combustion space, which has a pressure in excess of atmospheric pressure, to discharge the fuel remains left in the fuel nozzle into atmosphere by way of a drainage line provided for that purpose.

As mentioned above, the air provided therefor in a gas turbine engine with a heat exchanger is so hot, that the fuel remains left in the fuel nozzle cause a gradual carbonization and a contamination of the fuel nozzle connected therewith.

Thus, with the described operating procedure for blowing out the fuel nozzle of a gas turbine engine which has a heat exchanger, a reliable, continuous operation thereof cannot be guaranteed, or if it is, only when the fuel nozzle is separately serviced at relatively short intervals, i.e., cleaned and, if required, exchanged for another fuel nozzle. Additional servicing of this nature, the costs connected therewith, and last but not least, the engine down-time that go with it are undesirable in practice.

To overcome these disadvantages which occur in the described, known method of blowing out of the fuel nozzle of a gas turbine engine equipped with a heat exchanger, the general inventive concept essentially resides in that the air provided for blowing out one or more of the fuel nozzles has a substantially lower temperature than the combustion air supplied to the combustion chamber.

In a gas turbine engine equipped with a heat exchanger, the present invention also is seen to reside in removing the air, used for blowing out the fuel nozzle, from the gas turbine engine compressor, before it reaches the heat exchanger and is heated up therein.

When using a gas turbine engine as a drive or propulsion unit of a vehicle which has a compressed-air brake-system, it is further proposed, according to the present invention, to remove compressed air from the air brake system and to use it to blow out the fuel nozzle of the gas turbine engine.

In a further appropriate embodiment of the present invention, the fuel nozzle is to be installed in an outer casing, and blowing-out or bleed air is to be supplied during engine operation to an annular space formed between the casing and the nozzle by way of a bore or a port, which air flows with a turned-off fuel supply through the fuel nozzle and its associated fuel feed line in the direction opposite to the original fuel flow and escapes into the atmosphere by way of a valve.

A further installation of the present invention as an integral component of the gas turbine engine fuel supply system, which is actuated for blowing out the fuel nozzle depending on whether the fuel supply is turned on or off, is formed by a stepped piston, actuated within a cylinder fuel pressure against the effect of a return spring and provided with a valve body on its top side, which at first opens a central bore or port in the cylinder with increasing fuel pressure and thus enables fuel pressure to be applied to the lower annular area of the piston on the other side of the spring and subsequently thereto causes the speedy upward movement thereof, during which the piston opens up the bore or port for the fuel supply out of the cylinder space to the fuel nozzle and, in so doing, simultaneously closes with the valve body a valve provided for the discharge of the air used for blowing out the nozzle.

Finally, a further installation may be provided according to the present invention, in which the air, possibly removed from a compressed-air brake-system for the purpose of blowing out the fuel nozzle, passes, when the fuel supply is turned off, by way of a valve fixed at the end face of a cylinder, by way of the space on the spring side of the piston actuated inside the cylinder, and by way of a bore or port to the fuel nozzle and from there into the combustion chamber.

Figure 2:
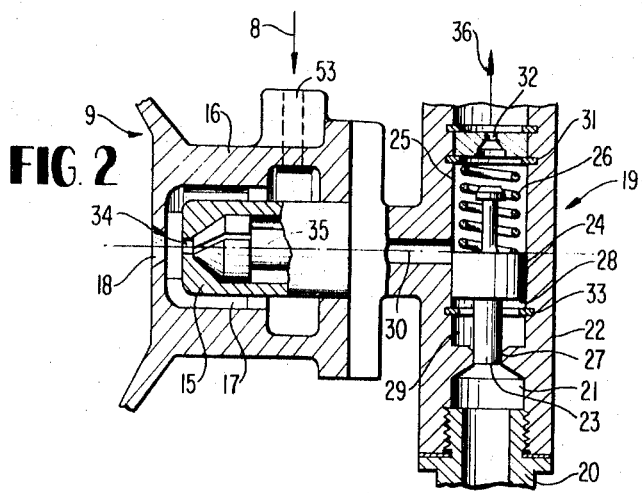
Figure 3:
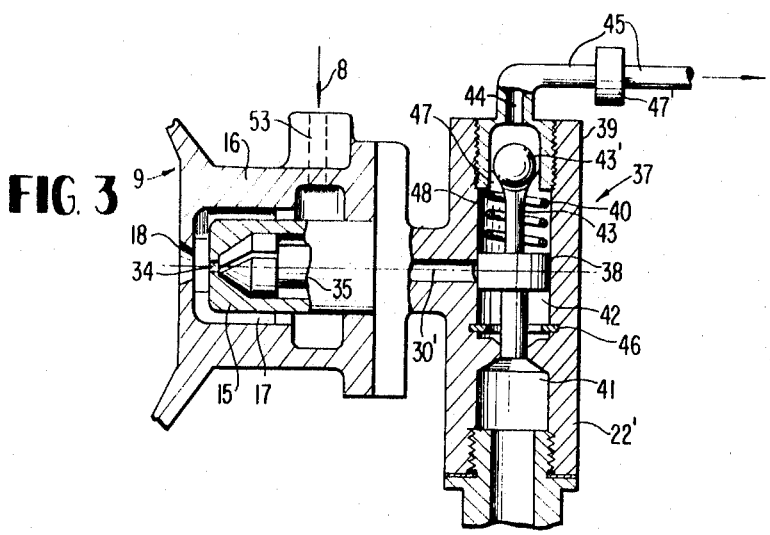

These and other objects, features and advantages of the present invention will become more obvious from the following description when taken in conjunction with the accompanying drawing which shows for purposes of illustration only, several embodiments in accordance with the present invention, and wherein FIG. 1 is a schematic view of a gas turbine engine, as viewed from the side thereof, FIG. 2 is a center longitudinal cross-sectional view of a first embodiment of the present invention in a gas turbine engine according to FIG. 1, used to blow out the fuel nozzle thereof, and FIG. 3 is a center longitudinal cross-sectional view of a further embodiment of the present invention in a gas turbine engine according to FIG. 1, also used to blow out the fuel nozzle.

Referring now to the drawing, wherein like reference numerals are used throughout the various views to designate like parts, FIG. 1 illustrates a single-shaft gas turbine engine of known design containing a compressor 1, which is connected by means of a shaft 2 with the turbine 3. Furthermore, a combustion chamber 4 and a heat exchanger 5 form part of the gas turbine drive unit.

To illustrate more clearly the cycle of the operating medium of the gas turbine engine, the air, drawn in by the compressor, flows in the direction of arrow 6 into compressor 1 and passing therethrough, reaches the heat exchanger 5 by way of a line 7. Flowing through the heat-exchanger 5, the air reaches the fuel injection device, generally designated by reference numeral 9, of the combustion chamber 4 by way of a line 8. The propellant gases, resulting from the ignition and combustion of the fuel and air components in the combustion chamber, flow into the turbine 3 by way of line 10. The exhaust gases passing through turbine 3 and driving the same, reach the heat exchanger 5 by way of a line 11. The hot exhaust gases flow through the heat exchanger 5 and in so doing, release a part of their heat to the compressor air to be supplied to the combustion chamber 4 of the engine. In this way, the compressor air to be supplied to the combustion chamber 4 is heated. As can be further seen from FIG. 1, it is possible to connect the two lines 7 and 8 by a line 12, and more particularly for the case when the fuel nozzle 15 (FIG. 2) is to be blown out with compressor air not heated up by the heat exchanger, after the fuel supply has been turned off, for example, when the gas turbine engine is shut down temporarily, in order to prevent carbonization of the fuel nozzle caused by the remains of the fuel left behind in the fuel nozzle and in the fuel supply lines to the nozzle, when the fuel supply is turned off. In this case, with a turned-off fuel supply, the heat exchanger 5 will be disconnected from the air supply system by, for example, the schematically illustrated shut off or closure devices 13, 14 located in the lines 7 and 8, as illustrated, and these devices 13, 14 interrupt the flow of the compressor air in and out of the heat exchanger 5 when the fuel injection is turned off, whereupon the compressor air reaches the fuel injection device 9 of the combustion chamber 4 directly by way of the lines 12 and 8.

The fuel injection device 9 reproduced in FIG. 1 is shown enlarged in FIG. 2 and essentially consists of the fuel nozzle 15, which is installed in an outer casing 16. Between the casing 16 and the fuel nozzle 15 is disposed an annular space 17 to which compressor air, heated up by the heat exchanger 5, is supplied from the pipe 8 by way of the bore or port 53 during engine operation, and this compressor air, together with the fuel, reaches the combustion chamber 4 by way of the opening 18 in the casing 16. A further device, generally designated by reference numeral 19, is flanged on to the fuel injection device 9. This device 19 is in communication with a fuel supply system of the gas turbine engine which is not further shown in the drawings. For example, the fuel delivered from a fuel tank by means of a pump to a fuel control unit flows, when the fuel supply is turned on, through the pipe connection 20 into the space 21 of the cylinder 22 and displaces by application of the pressure against the face 23, the stepped piston 24 against the action of a return spring 26, located in the space 25 of the cylinder 22. When the piston 24 clears the openings or port 27, there then follows, due to the application of the pressure against the lower annular area 28, a sudden, jump-like upward movement of the piston 24, and more particularly so far that the fuel supply can take place from the space 29 of the cylinder 22 into a bore or port 30 which leads to the fuel nozzle 15. Simultaneously with the clearing of the port 30 serving for the fuel supply to the fuel nozzle 15, a valve body 31, surrounded by the return spring 26 and secured to the upper side of the piston 24, has closed a valve 32.

Upon turning-off the fuel supply, as, for example, in the temporary shutting down of the gas turbine engine, accompanied by a reduction in fuel pressure, the piston 24, owing to the return force of the spring 26, moves to its initial position at the stop 33. As a result thereof, the piston 24 clears the valve 32 as well as the bore or port 30, so that the compressor air, now supplied by way of the lines 12 and 8 as well as the bore 53 to the annular space 17 is able, owing to the pressure in the combustion chamber 4 which is in excess of atmospheric pressure, when the fuel supply is turned off, to discharge the fuel remains, left in the fuel nozzle 15, by way of the bores 34, 35 and 30 and as well as by way of the space 25 of the cylinder 22, out of the valve 32 in the direction of the arrow 36 into a drainage line (not shown) and from there into atmosphere. Any fuel remains left in the fuel nozzle are thus blown out of the fuel nozzle 15, in a direction opposite to that of the original direction of fuel flow.

FIG. 3 illustrates, by means of a further embodiment of the present invention, a device, generally designated by reference numeral 37, which is preferably to be used with a gas turbine engine equipped with a heat exchanger (FIG. 1) for the drive of a vehicle.

The vehicle driven by the gas turbine is assumed to have a conventional compressed air-brake-system (not shown), the compressed air of which has a substantially lower temperature as compared to the heated air delivered by the engine compressor by way of the heat exchanger 5, and this compressed air is therefore to be utilized when the fuel supply is turned off, to discharge or blow out the fuel remains left in the fuel nozzle.

Similar to device 19 in FIG. 2, a stepped piston 38 in the cylinder 39 moves upwards, against the action of the return spring 40, when the fuel supply to device 37 is turned on, and in so doing, clears the way for the fuel supply from the spaces 41, 42 of the cylinder 39 by way of the bore or port 30′ to the fuel injection device 9. At the same time, a valve tappet 43, located on the upper side of the piston 38, closes, by means of the ball 43′, the bore or port 44 arranged on the upper face of the cylinder 39, to which is connected a line that is connected to the conventional compressed air reservoir of the brake-system. When the fuel supply is turned off, the piston 38, owing to both a reduction in fuel pressure and to the return force of the spring 40, returns to its initial position at the stop 46. The piston 38 at first clears by means of the ball 43′ located onto the upper side of the tappet 43, the bore or port 44 and thereupon the bore or port 47, so that compressed air taken from the compressed-air brake-system for blowing out the fuel nozzle reaches the bore 30′ by way of the line 45, a filter 47′ situated in this pipe 45, the bores 44, 47 and the cylinder space 48, in order to discharge or blow out any fuel remains, possibly left in the fuel nozzle 15, into the combustion chamber 4 by way of bores 35, 34 and 18.

The same reference numerals apply, by the way, in the description of the fuel injection device illustrated in FIG. 2 as for the fuel injection device 9 (FIG. 3) flangedly connected to device 37, as no changes have taken place.

Since on the basis of FIG. 3, the air provided to blow out the fuel nozzle 15 is not to be tapped or bled off from the gas turbine engine compressor 1, but from a compressed-air brake-system, the shut off devices 13, 14, schematically shown in FIG. 1 and located in the lines 7, along with the line 12 (FIG. 1) can, therefore, be dispensed with in the type of embodiment illustrated in FIG. 3 in conjunction and cooperation with a gas turbine installation according to FIG. 1.

During engine operation, compressor air, heated by the exhaust gases from the engine, which have been conducted at all times to the heat exchanger 5 by way of the line 11 (FIG. 1), flows, using the device 37 and the fuel injection device 9 (FIG. 3), by way of the line 8 to the fuel injection device 9, and more particularly by way of the bore 53 into the annular space 17, from where, together with the fuel delivered by way of the bores 35, 34, it reaches the combustion chamber 4 (FIG. 1) through the opening 18 in the casing 16.

In conclusion it is to be noted that the gas turbine drive unit illustrated in FIG. 1, in its construction and performance, in no way represents a binding form or limitative embodiment for the practical realization of the present invention.

The present invention can be used on gas turbine engines with two or more shafts just as with one or more power turbines arranged downstream of the compressor turbine or turbines; in addition, the present invention can be used with gas turbine engines having more than one heat exchanger.

Therebeyond, the present invention may be used with gas turbine engines which have more than one combustion chamber as well as more than one fuel injection device.

Thus, it is obvious that the present invention is not limited to the details shown and described herein but is susceptible of numerous changes and modifications as known to those skilled in the art, and we therefore do not wish to be limited to the details shown and described herein but intend to cover all such changes and modifications as are within the scope of those skilled in the art.

We claim:

1. A gas turbine engine which includes at least one compressor means, at least one combustion chamber means with fuel nozzle means, turbine means with at least one heat exchanger means, and further means for blowing out the fuel nozzle means with air to prevent a build-up of fuel deposits, characterized in that the air provided by said further means to blow out the fuel nozzle means has a substantially lower temperature than the combustion air on its way to the combustion chamber means, and in that the fuel nozzle means is installed in an outer casing means and blowing out air is supplied during engine operation, to an annular space formed between the casing means and the nozzle means by way of a bore, the blowing out air flowing with a turned off fuel supply through the fuel nozzle means and its associated feed line in a direction opposite to the original fuel flow and escaping into the atmosphere by way of a valve means.

2. A gas turbine engine according to claim 1, characterized in that a stepped piston means actuated in a cylinder by fuel pressure against the action of a return spring and having a valve body on its top side, is operable to open at first with increasing fuel pressure, a bore in the cylinder, thus enabling fuel pressure to be applied against to the lower annular area of the piston means on the other side of the spring and subsequently causes the speedy upward movement thereof, during which the piston means clears the bore for the fuel to be supplied from the cylinder space to the fuel nozzle means and in so doing, simultaneously closes with a valve body, a valve means operable to control the discharge of the air used for blowing out the nozzle means.

3. A gas turbine engine comprising compressor means, turbine means, combustion chamber means, fuel nozzle means having fuel inlet passage means arranged for introducing fuel into said combustion chamber means, heat exchanger means for heating air supplied by the compressor means, an outer nozzle casing means for accommodating the fuel nozzle means, said casing means and said nozzle means forming an annular space therebetween, bore means for supplying air heated by said heat exchanger to said annular space during normal operation of the engine, and fuel nozzle blow-out means for blowing out the fuel nozzle means to prevent a build-up of fuel deposits in response to an interruption of the fuel supply to the fuel nozzle means, said blow-out means including blow-out air introducing means for introducing blow-out air having a temperature lower than the combustion chamber to the nozzle area and blow-out air exhaust means for exhausting the blow-out air and associated fuel particles to the atmosphere, said air introducing means and said air exhaust means being arranged adjacent the fuel inlet passage means such that the blow-out air travels through the fuel inlet passage means in a direction opposite the direction of fuel flow that occurs during normal operation of the engine.

4. A gas turbine engine according to claim 3, characterized in that the air used to blow out the fuel nozzle means is removed from the gas turbine engine compressor means, before it reaches the heat exchanger means for heating the same.

5. A gas turbine engine according to claim 3, characterized in that said blow-out air introducing means includes said bore means and said annular space and in that bypassing means are provided for supplying unheated blow-out air to said bore means from said compressor in bypassing relationship to said heat exchanger.

6. A gas turbine engine according to claim 5, characterized in that said blow-out air exhaust means includes an exhaust valve means arranged upstream of the fuel nozzle means.

7. A gas turbine engine according to claim 6, further comprising fuel supply valve means for introducing fuel to the fuel inlet passage means from a fuel supply line, said fuel supply valve means and said exhaust valve means being operably connected to one another for selectively opening said fuel inlet passage means to atmosphere or to said fuel supply line in dependence on the fluid pressure existing in the fuel supply line.

8. A gas turbine engine according to claim 7, characterized in that said fuel supply valve means and said exhaust valve means include a common cylindrical housing means and a common stepped piston means arranged for axial movement within said cylindrical housing means, an upper end of said piston means having a first valve body for selectively closing an exhaust hole in said cylindrical housing means, a middle portion of said piston means including a second valve body for selectively closing said fuel inlet passage means, a lower end of said piston means including a third valve body for selectively closing said fuel supply line, said valve bodies being arranged such that the fuel inlet passage means is in communication with said exhaust hole and said fuel supply line is closed when said piston means is in a lower position and such that the fuel inlet passage means is in communication with said fuel supply line and said exhaust hole is closed when said piston means is in an upper position.

9. A gas turbine engine according to claim 8, characterized in that spring means are arranged in said cylindrical housing means in abutting engagement with a top surface of said second valve body for applying a downward spring force thereon, said second valve body including a lower surface for accepting fuel pressure forces from said fuel supply line at all times when said third valve body is not blocking said fuel supply line, whereby said second surface provides additional surface area for rapidly moving said piston means upward immediately after said third valve body is pushed out of blocking relationship to said fuel supply line by the fuel pressure.

10. A gas turbine engine according to claim 9, characterized in that said third valve body is a cylindrical end portion of said piston means and said second valve body is a cylindrical middle portion of said piston means, said second body being in sliding engagement with internal walls in said cylindrical housing at all times, said fuel inlet passage means extending radially through said walls, said second valve body having a larger diameter than said third valve body.

* * * * *